United States Patent [19]

Kruglikov et al.

[11] 4,243,780

[45] Jan. 6, 1981

[54] METHOD OF PREPARING CARBAMIDE-FURAN RESIN

[76] Inventors: Anatoly A. Kruglikov, ulitsa Vyazovskaya, 9, kv. 9; Militina A. Nikolaeva, ulitsa Vyazovskaya, 13, kv. 15, both of, Nizhny Tagil; Jury P. Vasin, ulitsa Lenina, 74, kv. 62, Chelyabinsk; Zolya Y. Itkis, ulitsa Svobody, 145, kv. 1, Chelyabinsk; Vladimir A. Shirinkin, ulitsa Ternopolskaya, 4, kv. 433, Chelyabinsk; Ida A. Zimina, ulitsa B. Pirogovskaya, 35, kv. 2, Moscow; Vladimir A. Strupinsky, ulitsa Tsiolkovskogo, 11, kv. 26; Valery V. Koposov, ulitsa Tsiolkovskogo, 11, kv. 51, both of, Nizhny Tagil, all of U.S.S.R.

[21] Appl. No.: 923,733

[22] Filed: Jul. 11, 1978

[51] Int. Cl.$^3$ ............................................. C08L 45/00
[52] U.S. Cl. .................................. 525/518; 525/161; 525/398; 525/509; 528/249
[58] Field of Search ............... 260/829; 528/249, 231; 525/414, 161, 518

[56] References Cited

U.S. PATENT DOCUMENTS

| | | | |
|---|---|---|---|
| 2,468,056 | 4/1949 | Goepfert | 260/829 |
| 2,601,497 | 6/1952 | Brown | 526/71 |
| 3,209,420 | 10/1965 | King | 164/16 |
| 3,471,429 | 10/1969 | Hayford | 260/29.4 R |
| 3,480,573 | 11/1969 | Thompson | 260/39 |
| 3,538,035 | 11/1970 | Cleek | 260/829 |

FOREIGN PATENT DOCUMENTS

| | | | |
|---|---|---|---|
| 610302 | 10/1948 | United Kingdom | 260/829 |
| 904813 | 5/1960 | United Kingdom . | |
| 908498 | 10/1962 | United Kingdom . | |
| 355189 | 11/1972 | U.S.S.R. . | |
| 355337 | 11/1972 | U.S.S.R. . | |

OTHER PUBLICATIONS

Chemical Abstracts, vol. 66, (1967), No. 47004g.
Chemical Abstracts, vol. 82, (1975), No. 157080s.
Chemical Abstracts, Vol. 82, (1975) No. 126152n.
Chemical Abstracts, vol. 83, (1975), No. 63899j.
Chemical Abstracts, vol. 63, (1965), No. 11790de.
Chemical Abstracts, vol. 70, (1969), No. 12342W.
Chemical Abstracts, vol. 72, (1970, No. 80408P.

*Primary Examiner*—Paul Lieberman
*Attorney, Agent, or Firm*—Fleit & Jacobson

[57] ABSTRACT

A method for preparing a carbamide-furan resin comprises reacting a urea-formaldehyde resin unlimitedly soluble in water with urea at a temperature within the range of from 50° to 85° C. and modifying the resulting urea-formaldehyde resin with furyl alcohol at a ratio therebetween expressed in parts by weight equal to 100:20–200 respectively at a temperature within the range of from 50° to 85° C., pH of from 7.2 to 8.9 simultaneously with dehydration of the product being modified under vacuum.

6 Claims, No Drawings

4,243,780

METHOD OF PREPARING CARBAMIDE-FURAN RESIN

FIELD OF THE INVENTION

The present invention relates to a method for preparing a carbamide-furan resin.

This resin is useful as a binder for the manufacture of cores in the foundry shops of automobile industry, tractor industry and other branches of mechanical engineering. This type binders have certain important advantages over other binders, namely lowered duration and reduced temperature of curing, evolution of a small amount of gases during foundry process, a good gas-permeability of cores, rapid and easy separation of cores after molding, possibility of a repeated use of sand after annealing of resin.

In particular, a carbamide-furan resin is useful in implementation of one of the most advanced processes of preparation of foundry cores, i.e. production of cores without heating in a cold fitting equipment.

BACKGROUND OF THE INVENTION

Known in the art is a method for preparing a carbamide-furan resin by way of modification, with furyl alcohol, of a sparingly-soluble in water urea-formaldehyde resin prepared by reaction of urea, monomethylolurea and formaldehyde. The modification process is conducted at a pH value within the range of from 5 to 6.5 and at a temperature of from 95° to 105° C.

The thus-prepared carbamide-furan resin is quite suitable for the manufacture of foundry cores by the "hotbox" method. However, in the production of cores from sand-resin mixtures on the basis of said resin in a cold molding equipment, said cores possess a low rate of cold curing and a tensile strength of cold-cured samples made of said sand-resin mixtures does not exceed 0.55 kgf/cm$^2$ after 0.5 hour and 2.1 kgf/cm$^2$ after 4 hours.

Known in the art is a method of preparing a carbamide-furan resin comprising modification, by means of furyl alcohol, of a urea-formaldehyde resin sparingly soluble in water and prepared by reacting urea, formaldehyde and tetraoxane. The modification is conducted at the temperature of 90° C. and pH=5.5.

The resulting carbamide-furyl resin ensures the production, in a high molding equipment, of cores possessing a high mechanical strength. At the same time, the use of this resin for the cold manufacture of cores, the core mixtures have a low curing rate; tensile strength of coldcured samples does not exceed 0.6 kgf/cm$^2$ after 0.5 hour and 2.05 kgf/cm$^2$ after 2 hours.

Therefore, the prior art methods of preparing carbamide-furan resins have disadvantages residing in that these resins, while ensuring a high mechanical strength of foundry cores in the "hot-box" process, are much less suitable for the manufacture of foundry cores in a cold moulding equipment due to a long duration required for curing of core mixtures based on said resins and an insufficient mechanical strength of the resulting cores. For this reason, carbamide-furan resins as produced by the prior art methods can be used for the manufacture of foundry cores in a cold moulding equipment only in such processes, where the curing time of cores is not limited and core shape is such that the resulting low mechanical strength of cores is acceptable.

BRIEF DESCRIPTION OF THE INVENTION

It is the main object of the present invention to provide a carbamide-furan resin with such properties which would ensure a high mechanical strength and a high curing rate of foundry cores made from sand-resin mixtures based on said resin in a cold moulding equipment.

This object is accomplished by that in a method for preparing a carbamide-furan resin by way of modification of a urea-formaldehyde resin with furyl alcohol, in accordance with the present invention use is made of a urea-formaldehyde resin unlimitedly soluble in water and prior to modification said urea-formaldehyde resin is reacted with urea at a temperature within the range of from 50° to 85° C. and said modification of the urea-formaldehyde resin with furyl alcohol is carried out at a weight ratio therebetween of 100:20–200 respectively, at a temperature within the range of from 50° to 85° C., pH of from 7.2 to 8.9 with a simultaneous dehydration of the modified product under vacuum.

This combination of the above-mentioned steps along with the use of urea-formaldehyde resins unlimitedly soluble in water for said modification with furyl alcohol ensures the preparation of the desired product possessing the required spectrum of properties.

It is desirable that the reaction of a urea-formaldehyde resin with urea be conducted at a weight ratio therebetween expressed in parts by weight equal to 100:5–8 respectively.

It is preferable to effect the modification of a urea-formaldehyde resin with furyl alcohol at a temperature within the range of from 55° to 65° C.

It is advisable that the modification of a urea-formaldehyde resin with furyl alcohol be conducted at a weight ratio therebetween equal to 100:50–60 respectively.

It is also advisable that the modification of a urea-formaldehyde resin with furyl alcohol be conducted at a pH value of from 7.5 to 8.5.

It is preferable to perform said modification of a urea-formaldehyde resin with furyl alcohol simultaneously with dehydration of the product being modified under vacuum of from 650 to 700 mm Hg to achieve a refraction index of from 1.505 to 1.510.

DETAILED DESCRIPTION OF THE INVENTION

The method for preparing a carbamide-furan resin is performed in the following manner.

Into a reactor provided with a reflux condenser, stirrer and a steam jacket there is charged a urea-formaldehyde resin having an unlimited solubility in water and then urea is added thereto under stirring.

The resulting mixture is heated to a temperature within the range of from 50° to 85° C. and maintained at this temperature to a complete dissolution of urea. Afterwards, furyl alcohol is charged into the reactor along with an alkali agent and a pH value is adjusted within the range of from 7.2 to 8.9. Simultaneously vacuum is created in the reactor and the carbamide oligomer is modified with furyl alcohol and dehydrated at the same time. Upon achievement of a refraction index of 1.505–1.510 the vacuum is released, the reactor contents are cooled down and drained into a vessel for the final product.

When the process is conducted continuously, the urea-formaldehyde resin havig an unlimited solubility in water is continuously fed into the reactor, whereinto urea is also continuously supplied. The reaction of the resin with urea in the reactor is carried out upon heating and continuous stirring.

The resulting product is continuously fed, through a hydraulic seal and back valve, into a continuous-action evaporation apparatus with a forced circulation, whereinto furyl alcohol is also continuously fed along with an alkali agent to adjust a required pH value. In this apparatus a modification of the urea-formaldehyde resin with furyl alcohol occurs simultaneously with dehydration of the product being modified, which product is withdrawn from the evaporation apparatus through a barometric pipe and passed through a tubular heat-exchanger, wherein it is cooled, and then drained into a vessel for the final product.

The process for the preparation of a carbamide-furan resin can be performed either periodically or continuously; it may be also made fully automated.

The urea-formaldehyde resin as used in the method according to the present invention is unlimitedly soluble in water and may be prepared, specifically, by a three-stage condensation of urea and formaldehyde successively in an alkaline, acidic and neutral media with the use of aromatic or aliphatic sulphonic acids in the stage of the acidic condensation as a catalyst.

This urea-formaldehyde resin has the following characteristics:
1. Appearance: a uniform syrup-like yellowish liquid.
2. Content of dry solids, wt.%: 60 to 65.
3. Miscibility with water at any ratio of resin to water: unlimited.
4. Viscosity, as measured by a viscosimeter with a 5.4 mm nozzle at the temperature of $20°\pm1°$ C., seconds: 5 to 30.
5. Concentration of hydrogen ions (pH): 7.5 to 9.0.
6. Free formaldehyde content, wt.%: 3.5 to 5.2.

A carbamide-furan resin produced from the above-specified urea-formaldehyde resin by the method according to the present invention has the following properties.

As to the appearance, it comprises a uniform transparent light-brown liquid. This resin is unlimitedly dissolved in water. Upon addition of any amount of water to the resin a uniform transparent solution is formed. No coagulation of the resin or turbidity of the solution evidencing liberation of the solid phase therefrom is observed.

Viscosity of this resin as measured by a viscosimeter with a 5.4 mm nozzle at the temperature of $20°\pm1°$ C. is varied within the range of from 30 to 150 seconds. Value of pH is within the range of from 7.3 to 9.0 and the content of free formaldehyde is varied from 1.5 to 2.0% by weight.

Stability of properties of this resin is more than three months which is quite sufficient for its long-distance transportation, storage and subsequent use.

The above-mentioned carbamide-furan resin has a high rate of cold curing upon introduction of orthophosphoric acid, while cold-curable foundry mixtures produced therefrom have a high mechanical strength in the cured condition.

Tensile strength of cold-cured samples made from the sand-resin mixtures on the basis of the above-specified carbamide-furan resin is as follows:
after 0.5 hour—2.0 to 3.5 kgf/cm$^2$;
after 2 hours—8.0 to 10 kgf/cm$^2$;
after 4 hours—18.0 to 20.0 kgf/cm$^2$;
after 24 hours—20.0 to 24.0 kgf/cm$^2$.

The method for preparing a carbamide-furan resin in accordance with the present invention, unlike the prior art processes, makes it possible to prepare a resin with such properties which ensures an increased mechanical strength by 3-5 times along with a high curing rate of foundry cores made of sand-resin mixtures based thereon in a cold moulding equipment. This, in turn, enables the manufacture of cores with a more sophisticated shape and increase the productivity of foundry-core production shops For a better understanding of the present invention some specific examples are given hereinbelow by way of illustration.

EXAMPLE 1

Into a metallic reactor provided with a cooler, stirrer, steam-water jacket and a vacuum-receiver there are charged 100 parts by weight of a water-soluble urea-formaldehyde resin having the following characteristics:
1. Miscibility with water at any ratio between resin and water: unlimited.
2. Dry solids content: 62.1 wt.%;
3. Viscosity as measured by a viscosimeter with a 5.4 mm nozzle at the temperature of $20°\pm1°$ C.: 10 seconds;
4. pH value: 7.8;
5. Free formaldehyde content: 4.5 wt.%.

Thereafter, 6.5 parts by weight of urea are added into the reactor. The resulting mixture is heated under stirring to the temperature of 60° C. and the mixture is maintained at 60°-61° C. till a complete dissolution of urea. Afterwards, furyl alcohol is fed into the reactor in the amount of 55 parts by weight and a 4% solution of caustic soda is added thereto to adjust pH value at 8.0 Modification of the resin with furyl alcohol simultaneously with dehydration is conducted at the temperature of 60°-61° C. under vacuum of 650-700 mm Hg to achieve the refraction index of 1.507. Then the resulting resin is cooled down to 40° C. and drained into a vessel for the final product.

The carbamide-furan resin thus obtained has the following characteristics:
1. Miscibility with water: unlimited;
2. Viscosity by a viscosimeter with a 5.4 mm nozzle at the temperature of $20°\pm1°$ C.: 62 seconds;
3. pH value: 8.1;
4. Free formaldehyde content: 1.7 wt.%;
5. Refraction index: 1.508.

Tensile strength of cold-cured samples manufactured from a sand-resin mixture on the basis of this resin is the following:
after 0.5 hour: 3.5 kgf/cm$^2$;
after 2 hours: 10.0 kgf/cm$^2$;
after 4 hours: 19.5 kgf/cm$^2$;
after 24 hours: 24.0 kgf/cm$^2$.

EXAMPLE 2

Into a reactor provided with a cooler, stirrer, a steam-water jacket and a vacuum-receiver there are charged 100 parts by weight of a water-soluble urea-formaldehyde resin having the following properties:
1. Miscibility with water at any ratio between the resin and water: unlimited;
2. Dry solids content: 65.0 wt.%;
3. Viscosity as measured by a viscosimeter with a 5.4 mm nozzle at the temperature of $20°\pm1°$ C.: 30 seconds;

4. pH value: 7.9;
5. Free formaldehyde content: 4.0 wt.%.

Then 5 parts by weight of urea are added into the reactor. The resulting mixture is heated under stirring to the temperature of 69° C. and the mixture is maintained at 69°–70° C. till a complete dissolution of urea. Thereafter, furyl alcohol is added into the reactor in the amount of 60 parts by weight along with a 4% solution of caustic soda to adjust the pH value at 7.5. Modification of the resin with furyl alcohol simultaneously with dehydration is conducted at the temperature of 69°–70° C. under vacuum of 650–700 mm Hg to achieve the refraction index of 1.506. Then the resulting resin is cooled to the temperature of 40° C. and drained into a vessel for the final product. The resulting carbamide-furan resin has the following characteristics:
1. Miscibility with water: unlimited;
2. Viscosity as measured by a viscosimeter with a 5.4 mm nozzle at the temperature of 20°±1° C.: 43 seconds;
3. pH value: 7.6;
4. Free formaldehyde content: 2.0 wt.%;
5. Refraction index: 1.506, Tensile strength of cold-cured samples made of a sand-resin mixture on the basis of the above-specified resin is the following:
   after 0.5 hour: 3.4 kgf/cm$^2$;
   after 2 hours: 9.6 kgf/cm$^2$;
   after 4 hours: 20.0 kgf/cm$^2$;
   after 24 hours: 23.1 kgf/cm$^2$.

EXAMPLE 3

Into a reactor provided with a cooler, stirrer, a steam-water jacket and a vacuum receiver, there are charged 100 parts by weight of a urea-formaldehyde resin having the following characteristics:
1. Miscibility with water at any ratio between the resin and water: unlimited;
2. Content of dry solids: 61.4 wt.%;
3. Viscosity as measured by a viscosimeter with a 5.4 mm nozzle at the temperature of 20°±1° C.: 24 seconds;
4. pH value: 8.4;
5. Free formaldehyde content: 3.5 wt.%.

Then 7 parts by weight of urea are placed into the reactor. The resulting mixture is heated under stirring to the temperature of 55° C. and the mixture is maintained at 55°–56° C. till a complete dissolution of urea. Afterwards, furly alcohol is added into the reactor in the amount of 50 parts by weight along with a 4% solution of caustic soda to bring the pH value of 7.2. Modification of the resin with furyl alcohol simultaneously with dehydration is effected at the temperature of 55°–56° C. under vacuum of 650–700 mm Hg to achieve the refraction index of 1.508. Thereafter, the resulting resin is cooled to the temperature of 40° C. and drained into a vessel for the final product. The thus-prepared carbamide-furan resin has the following characteristics:
1. Miscibility with water: unlimited;
2. Viscosity as measured by a viscosimeter with a 5.4 mm nozzle at the temperature of 20°±1° C.: 78 seconds;
3. pH value: 7.3;
4. Free formaldehyde content: 1.6 wt.%;
5. Refraction index: 1.508.

Tensile strength of cold-cured samples made of a sand-resin mixture prepared on the basis of the above-specified resin is as follows:
   after 0.5 hour: 3.3 kgf/cm$^2$;
   after 2 hours: 9.8 kgf/cm$^2$;
   after 4 hours: 19.4 kgf/cm$^2$;
   after 24 hours: 22.9 kgf/cm$^2$.

EXAMPLE 4

Into a reactor provided with a cooler, stirrer, a steam-water jacket and a vacuum receiver there are charged 100 parts by weight of a urea-formaldehyde resin having the following characteristics:
1. Miscibility with water at any ratio between the resin and water: unlimited;
2. Content of dry solids: 60.0 wt.%;
3. Viscosity as measured by a viscosimeter with a 5.4 mm nozzle at the temperature of 20°±1° C.: 5 seconds;
4. pH value: 9.0;
5. Free formaldehyde content: 4.6 wt.%.

Then 6 parts by weight of urea are charged into the reactor. The resulting mixture is heated under stirring to the temperature of 50° C. and the mixture is maintained at 50°–51° C. till a complete dissolution of urea. Afterwards, furyl alcohol is charged into the reactor in the amount of 20 parts, by weight along with a 4% solution of caustic soda to bring the pH to 9.9. Modification of the resin with furyl alcohol with a simultaneous dehydration is conducted at the temperature of 50°–51° C. under vacuum of 650–700 mm Hg to achieve the refraction index of 1.510. Thereafter the resulting mixture is cooled to the temperature of 40° C. and drained into a vessel for the final product. The carbamide-furan resin thus obtained has the following characteristics:
1. Miscibility with water: unlimited;
2. Viscosity as measured by a viscosimeter with a 5.4 mm nozzle at the temperature of 20°±1° C.: 150 seconds;
3. pH value: 9.0;
4. Free formaldehyde content: 1.8% by weight;
5. Refraction index: 1.510.

Tensile strength of cold-cured samples manufactured from a sand-resin mixture prepared on the basis of the above-specified resin is as follows:
   after 0.5 hour: 3.0 kgf/cm$^2$;
   after 2 hours: 8.8 kgf/cm$^2$;
   after 4 hours: 18.7 kgf/cm$^2$;
   after 24 hours: 21.6 kgf/cm$^2$.

EXAMPLE 5

Into a reactor provided with a stirrer, cooler, a steam-water jacket and a vacuum receiver there are charged 100 parts by weight of a urea-formaldehyde resin having the following properties:
1. Miscibility with water at any ratio between the resin and water: unlimited;
2. Content of dry solids: 63.7 wt.%;
3. Viscosity as measured by a viscosimeter with a 54 mm nozzle at the temperature of 20°±1° C.: 17 seconds;
4. pH value: 7.5
5. Content of free formaldehyde: 5.2 wt.%.

Then 8 parts by weight of urea are charged into the reactor. The resulting mixture is heated under stirring to the temperature of 64° C. and the mixture is maintained at 64°–65° C. till a complete dissolution of urea.

Thereafter, furyl alcohol is brough into the reactor in the amount of 200 parts by weight along with a 4% solution of caustic soda to adjust the solution pH at 8.5. Modification of the resin with furyl alcohol with a simultaneous dehydration is conducted at 64°–65° C. under vacuum of 650–700 mm Hg till the refraction index of 1.505 is achieved. Then the resulting resin is cooled to the temperature of 40° C. and drained into a vessel for the final product. The carbamide-furan resin thus obtained has the following characteristics:
1. Miscibility with water: unlimited;
2. Viscosity as measured by a viscosimeter with a 5.4 mm nozzle at the temperature of 20°±1° C.: 30 seconds;
3. pH value: 8.6;
4. Free formaldehyde content: 1.5 wt.%;
5. Refraction index: 1.505.

Tensile strength of cold-cured samples manufactured from a sand-resin mixture prepared on the basis of the above-specified resin is the following:
   after 0.5 hour: 2.0 kgf/cm$^2$;
   after 2 hours: 8.0 kgf/cm$^2$;
   after 4 hours: 18.0 kgf/cm$^2$;
   after 24 hours: 20.0 kgf/cm$^2$.

EXAMPLE 6

This Example is given to illustrate a continuous mode of the preparation of a carbamide-furan resin according to the present invention.

A urea-formaldehyde resin having an unlimited solubility in water is continuously fed into a reactor provided with a cooler, stirrer and a steam-water jacket at the rate ensuring the residence time of 20 minutes in the reactor.

The resin supplied into the reactor has the following characteristics:
1. Miscibility with water at any ratio between the resin and water: unlimited;
2. Content of dry solids: 61.8 wt.%;
3. Viscosity as measured by a viscosimeter with a 5.4 mm nozzle at the temperature of 20°±1° C.: 12 seconds;
4. pH value: 8.1;
5. Content of free formaldehyde: 4.3 wt.%.

Into the same reactor urea is continuously charged at the rate of 6 parts by weight per 100 parts by weight of the supplied urea-formaldehyde resin. The reaction of urea with the resin occurs upon heating to the temperature of 55°–56° C. under continuous stirring. The product formed in the reactor is continuously fed, through a hydraulic seal and a back valve, into a continuous-action evaporation apparatus set under vacuum and provided with a forced circulation system; into the apparatus furyl alcohol is also continuously fed at the rate of 55 parts by weight per 100 parts by weight of the supplied urea-formaldehyde resin along with a 4% solution of caustic soda in the amount ensuring pH of the reaction mixture equal to 7.6. Modification of said resin with furyl alcohol with a simultaneous dehydration is effected in an evaporation apparatus at the temperature of 55°–56° C. under vacuum of 650–700 mm Hg.

The dehydrated carbamide-furan resin is withdrawn from the evaporation apparatus through a barometric pipe and passed into a tubular heat-exchanger, wherein it is cooled to the temperature of 40° C. and then fed into a vessel for the final product.

The carbamide-furan resin thus obtained has the following characteristics:
1. Miscibility with water: unlimited;
2. Viscosity as measured by a viscosimeter with a 5.4 mm diameter at the temperature of 20°±1° C.: 60 seconds;
3. pH value: 7.7;
4. Free formaldehyde content: 1.6 wt.%;
5. Refraction index: 1.507.

Tensile strength of cold-cured samples manufactured from a sand-resin mixture prepared on the basis of the above-specified resin is the following:
   after 0.5 hour: 3.5 kgf/cm$^2$;
   after 2 hours: 9.9 kfg/cm$^2$;
   after 4 hours: 19.8 kgf/cm$^2$;
   after 24 hours: 23.7 kgf/cm$^2$.

What is claimed is:

1. A method for preparing a carbamide-furan resin suitable for use as a binder in the manufacture of high strength foundry molds and cures by cold curing, said method comprising the steps of:
   (a) reacting an unlimitedly water-soluble urea-formaldehyde resin with urea at a temperature from about 50° to 85° C., whereby the free formaldehyde content of the urea-formaldehyde resin is reduced;
   (b) modifying the resulting urea-formaldehyde resin by adding furyl alcohol in an amount by weight of from about 0.2 to 2 times the weight of the urea-formaldehyde resin at a temperature of from about 50° to 85° C. and a pH of from about 7.2 to 8.9; and
   (c) simultaneously dehydrating the resulting resin under vacuum while conducting the modification step (b), whereby a carbamide-furan resin having an unlimited miscibility in water and a high cold curing rate is produced.

2. A method as claimed in claim 1, wherein the reaction between a urea-formaldehyde resin and urea is conducted at a ratio therebetween expressed in parts by weight of 100:5–8 respectively.

3. A method as claimed in claim 1, wherein modification of a urea-formaldehyde resin with furyl alcohol is conducted at a temperature with the range of from 55° to 65° C.

4. A method as claimed in claim 1, wherein modification of a urea-formaldehyde resin with furyl alcohol is conducted at a ratio therebetween expressed in parts by weight of 100:50–60 respectively.

5. A method as claimed in claim 1, wherein modification of a urea-formaldehyde resin with furyl alcohol is conducted at a pH value within the range of from 7.5 to 8.5.

6. A method as claimed in claim 1, wherein modification of a urea-formaldehyde resin with furyl alcohol is conducted with a simultaneous dehydration of the modified product under vacuum of 650–700 mm Hg till a refraction index of 1.505–1.510 is achieved.

* * * * *